Sept. 5, 1967 G. HOTZ 3,340,507

ERROR DETECTION AND CORRECTION CIRCUIT

Filed Nov. 30, 1964 2 Sheets-Sheet 1

Inventor:
GÜNTER HOTZ

BY Spencer & Kaye

ATTORNEYS

Sept. 5, 1967 G. HOTZ 3,340,507

ERROR DETECTION AND CORRECTION CIRCUIT

Filed Nov. 30, 1964 2 Sheets-Sheet 2

Inventor:
GÜNTER HOTZ
BY Spencer & Kaye
ATTORNEYS 3,340,507

ERROR DETECTION AND CORRECTION CIRCUIT

Günter Hotz, Saarbrucken, Germany, assignor to Telefunken Patentverwertungs-G.m.b.H., Ulm (Danube), Germany Filed Nov. 30, 1964, Ser. No. 414,799
Claims priority, application Germany, Nov. 28, 1963, T 25,151
7 Claims. (Cl. 340—146.1)

The present invention relates generally to the data processing art and, more particularly, to a data transfer system which comprises, at the transmission side, a coding unit in which an $n$-digit check vector is formed for each group of data, and which comprises a similar coding unit at the receiving side in which an $n$-digit correction vector is formed from the transferred binary sequence of the data group and the check vector, which correction vector subsequently serves for the detection of a transfer error in a correcting device and may be corrected.

A bit group is herein defined as a "vector." The term "check vector" designates a specific bit group which is derived from the data being transferred and which is used for error detection and error correction on the receiving side. The term "correction vector" designates a bit group formed at the receiving side and which directly serves for error correction.

Such systems are known as such. With regard to the theoretical principles thereof, reference is made to W. W. Peterson's book, Error Correcting Codes, The Technology Press, 1961. There, numerous codes and their characteristics are discussed. The class of codes to which the present invention relates is called systematic error checking or group codes. Their characteristics are discussed in detail in an article by the inventor in the "Annales Universitatis Saraviensis—Scientia," vol. IX, Fasc. 1/2 1960/61, pages 3 to 12.

On page 11 of this publication there is an example of a particularly favorable code called a "maximum" (4, 7, 5) code for four information elements and seven check bits. The following table shows a matrix-like binary pattern according to this code, the eleven columns of which form eleven seven-dimensional binary vectors.

TABLE

| (1) | (2) | (3) | (4) | (5) | (6) | (7) | (8) | (9) | (10) | (11) |
|---|---|---|---|---|---|---|---|---|---|---|
| 1 | 0 | 0 | 1 | 1 | 0 | 0 | 0 | 0 | 0 | 0 |
| 1 | 0 | 1 | 1 | 0 | 1 | 0 | 0 | 0 | 0 | 0 |
| 1 | 0 | 1 | 0 | 0 | 0 | 1 | 0 | 0 | 0 | 0 |
| 1 | 1 | 0 | 0 | 0 | 0 | 0 | 1 | 0 | 0 | 0 |
| 0 | 1 | 1 | 1 | 0 | 0 | 0 | 0 | 1 | 0 | 0 |
| 0 | 1 | 0 | 1 | 0 | 0 | 0 | 0 | 0 | 1 | 0 |
| 0 | 1 | 1 | 0 | 0 | 0 | 0 | 0 | 0 | 0 | 1 |

If it is desired to use such a pattern to form check characters, then a binary information element of the data group is allocated to each column and the column vectors whose information elements have the value One (1) are added together according to the sum modulo 2.

For example, if a data group 1001 is to be provided with a check vector, then the latter is obtained by adding the first and fourth columns of the pattern giving 0011110. If then a correction vector is formed at the receiving side from the data group and the check vector (10010011110) in the same manner as the check vector, i.e., by adding according to the sum modulo 2 each of the column vectors corresponding to a binary ONE of the transmitted data group and check vector, then this is Zero (0) in every place if the transfer was effected without error. A single error leads to a correction vector which corresponds precisely to the column in the pattern in which the associated information element is erroneous. A multiple error leads to a vector which corresponds to the vector sum of a plurality of columns. Thus the information elements associated with these columns are recognized as being erroneous.

With these essentially theoretical facts in mind, it is the main object of the present invention to provide a transfer system which requires but a low expenditure both in physical equipment and monetarily.

Another object of the present invention is that it is suitable for any systematic error checking group code which is advantageous from the point of view of error detection.

These objects and other ancillary thereto are accomplished in accordance with preferred embodiments of the present invention wherein a coding unit is provided which includes an $n$-digit counter which, in synchronism with the data transfer, holds different $n$-dimensional binary vectors ready at its $n$ place outputs. The components of such binary vectors are only transferred in parallel through $n$ Exclusive-Or gates to an $n$-digit register when the binary value One is present on the data channel. The outputs of this register likewise act on the Or-gates, and the coding unit present at the transmission side includes means through which the contents of the register are supplied as a check vector to the transmission channel after the passage of a data group. The register in the coding unit at the receiving side acts jointly with the counter on a comparison device. The output pulse from this comparison device reverses the binary value of a binary place in the data group, including the check vector, for that binary place which is associated with the particular state of the counter, if there is identity between the register contents and the counter state.

Additional objects and advantages of the present invention will become apparent upon consideration of the following description when taken in conjunction with the accompanying drawings in which.

Figure 1:
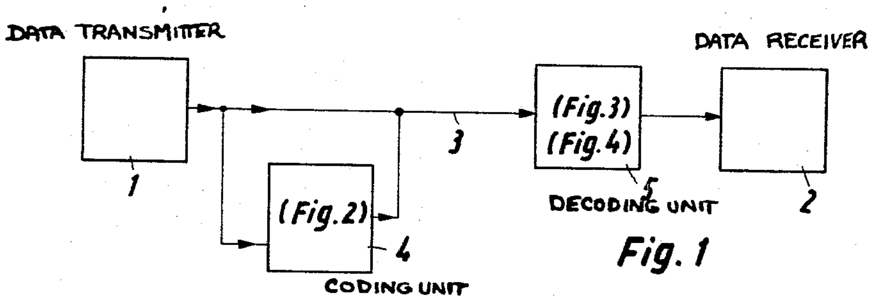
FIGURE 1 is a block diagram of a data transfer system.

With more particular reference to the drawings, FIGURE 1 is a block circuit diagram of a transfer system with a data transmitter 1 and a data receiver 2. Not only the data in groups are transferred from the transmitter 1 over the transmission channel 3, but also check vectors which are derived from the data group at the transmission side in a coding unit 4. At the receiving side, the transmission channel 3 ends in a decoding unit 5 in which transfer errors are detected by means of the check vectors and may be corrected before the data group reaches the receiver 2.

Figure 2:
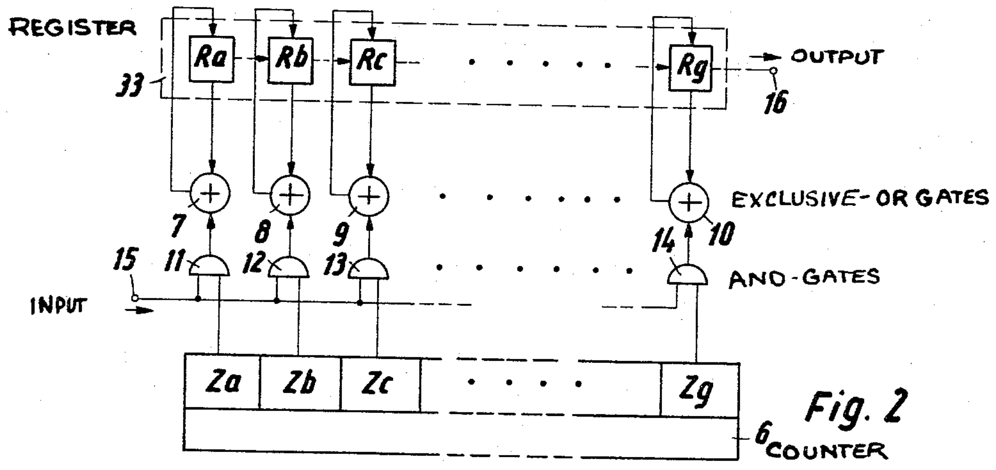
FIGURE 2 is a circuit diagram of a coding unit for the transmission side of the system.

Within the framework of this general scheme, the invention is concerned with the coding unit 4 of which one embodiment is shown in FIGURE 2, and with the decoding unit 5 of which two embodiments are explained in detail with reference to FIGURES 3 and 4.

FIGURE 2 shows a coding unit according to the invention in which an $n$-place check vector is formed. The coding unit contains, as an essential element, a counter 6 which has $n$ outputs. For the code mentioned hereinbefore, $n=7$; the counter is capable of assuming eleven different states corresponding to the eleven columns of the pattern shown in the table. It preferably contains seven bistable elements, the output and inputs of which are connected in known manner through logic AND-gates and OR-gates in such a manner that a sequence of states corresponding to the columns in the table appears at the outputs. A clock-pulse source (not shown) triggers the counter by one state in each unit of time.

At this juncture, it may once again be emphasized that the invention is not restricted to the mentioned code alone, and that the selection of a specific code merely leads to a corresponding bit pattern similar to that of the table and hence a suitable construction of the counter 6. This counter is not, per se, the subject of the present invention, however.

Furthermore, the coding unit contains an *n*-place register 33 with the bistable register elements R*a*, R*b*, R*c* . . . R*g*, as well as *n* Exclusive-Or gates 7 to 10. The first input of each of the OR-gates is connected to the output of a bistable element of the register, and the output of each of the OR-gates acts on the input of the same register element. The *n* outputs of the counter 6 are each connected through an AND-gate 11 to 14, to the second inputs of the Exclusive-Or gates 7 to 10. All AND-gates are jointly controlled by an input 15 of the coding unit to which is applied the signal sequence, the check vector of which is to be found. Thus, the Exclusive-Or gates act precisely as if the bistable register elements had an alternating input controlled directly by the AND-gates.

Such a coding unit fulfills the above-mentioned function in that the state of the counter 6 is always combined with the contents of the register through the Exclusive-Or gates to form fresh register contents whenever a pulse having the significance One appears at the input 15. At the beginning of the operation, the register is cleared and the counter 6 is in a defined initial position which corresponds to the first column (1) of the table. On the arrival of the first information signal at the input 15 and on each of the further information signals, which appear in synchronism with the clock pulses, the counter is triggered. When the last information signal or bit (the fourth in the present example) has arrived, then the register 33 of the coding unit contains an *n*-dimensional check vector which is transmitted over the transmission channel through the output 16 in the interval of time before the next group of information bits arrives at the input 15. For this purpose, the register is adapted for shifting, when desired, so that after the check vector is formed the register is placed into its shifting mode and then signals "0" and "1" comprising this vector appear successively at output 16. It is obvious that this simple coding unit is capable of forming a check vector in accordance with the numerical example mentioned in the introduction. The shifting pulses for register 33 as well as control pulses for switching means mentioned in the following text and clock pulses are provided by a central control unit not shown in the drawings. The same central control units controls the right sequence of information bits and check bits on transmission path between the data transmitter and the data receiver.

A particular advantage of the invention is that the same coding unit is also used at the receiving side to form the correction vector, and that only minor extensions are required in order to carry out the correction of the transferred data group with the same devices.

Figure 3:
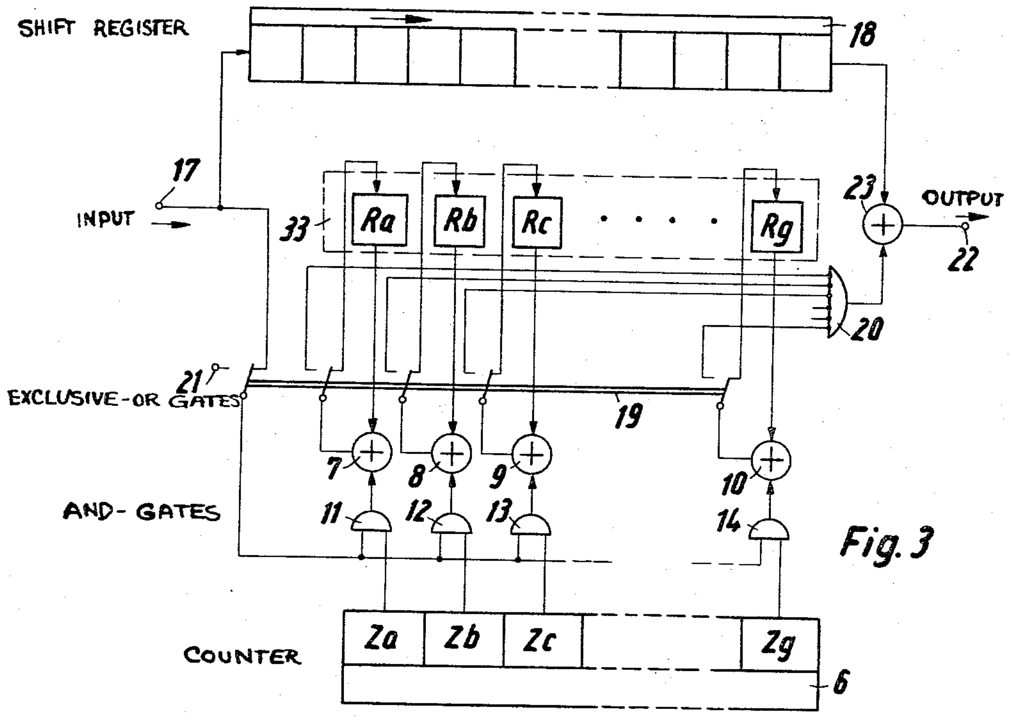
FIGURE 3 is a circuit diagram of an embodiment of a decoding unit for the receiving side which provides single error correction.

Such a decoding unit is illustrated in FIGURE 3. It likewise contains a counter 6, the outputs of which represent the columns of the bit pattern, which is the same for the transmitting and receiving sides. Here, again, are the Exclusive-Or gates 7 to 10, the register 33 with the elements R*a*, R*b*, R*c* . . . R*g*, and the AND-gates 11 to 14.

In the simplest case, the decoding operation can be divided into two steps, the first of which serves to form the correction vector in the register and the second for the correction of the data group by means of the correction vector. The first step lasts precisely as long as the transfer of a data group including check characters. Not until the last check character has arrived through the input 17 of the decoding unit, can the correction begin. A delay member is provided for the temporary storage of the data group. This delay member is formed, for example, by a shift register 18 which has the transferred data group supplied to its input. After the termination of the first step (formation of the correction vector in the register) the first transferred information bit has just reached the output of the shift register.

All that is needed to control the two steps is a multiple contact switch 19, in the normal position of which the outputs of all the Exclusive-Or gates 7 to 10 are connected to the inputs of the register elements R*a* to R*g*, and this is the position shown in FIGURE 3. In this contact position, the information input 17 is connected to the AND-gates 11 to 14, as the input 15 in FIGURE 2, so that, as in the coding operation, the vector is formed by addition of the counter contents to the register contents depending on the state of the information at the input 17. The multiple contact switch 19 as well as similar switches or contact banks mentioned below are shown as mechanical switches only for simplicity. It should be clear that electronic switches in the form of transistor and/or diode circuits will be used in practice.

After the conclusion of the first step, that is to say, when the correction vector has been formed, the multiple contact switch 19 is brought into its other position so that the outputs of the Exclusive-Or gates are no longer connected to the inputs of the register but to the inputs of a comparison network 20. This comparison network in the simplest case is a NOR-gate, the output of which is only energized when all its inputs have the logic significance Zero. The output of this comparison network is therefore energized precisely when the contents of the counter 6 coincide with those of the register. Only then is none of the Exclusive-Or gates 7 to 10 energized. A separate contact of the multiple contact switch 19 has disconnected the information input 17 from the AND-gates 11 to 14 and connected the latter to a voltage signifying a logic One, which is applied to an input 21. This ensures that the AND-gates 11 to 14 are continuously open during the second step, so that the comparison can be carried out undisturbed.

Mention has already been made of the fact that an individual error causes a correction vector which corresponds precisely to that column of the pattern in the table with which the erroneous information bit was associated. Since the shift register 18 is synchronized with the counter 6, the effect is achieved that the erroneous information bit appears at the output of the shift register for transfer to an output 22 of the decoding unit just when the contents of the counter 6 coincide with the correction vector. As a result, the correction is possible immediately after an error has been detected because the output signal from the comparison network 20 now only has to be used to reverse the information bit present at the output of the shift register with regard to its binary significance. This is effected in an Exclusive-Or gate 23 in a manner known per se. The output of this gate forms the output 22 of the decoding unit directly and is connected to the input of the data receiver 2 shown in FIGURE 1.

The circuit described so far is therefore capable of forming in the first step a corrective vector which is naturally Zero, if no transfer error occurred, and of localizing and correcting the erroneous information bit by means of a comparison network in the second step. If double errors or multiple errors have occurred during the transfer, then the decoding unit as shown in FIGURE 3 is merely capable of detecting the fact that such errors did occur but not of correcting them. In this case, no identity between the counter contents and the correction vector can be detected during the whole of the second step. The data group is then issued after the termination of the second step. A signal can, however, be derived from the fact that no identity appeared, particularly reporting the instruction to the transmitting station to transmit the data group previously transferred once again.

There are, however, codes which, in principle, permit the correction of multiple errors. For example, the code given in the table permits the correction of individual and double errors, and the two erroneous information bits may be situated anywhere within the data group, including the check vector. It is therefore advisable to adapt the decoding unit to the basic capacities of the code. It is found that this adaptation is possible by means of relatively minor additions to the decoding unit which corrects single errors.

Figure 4:
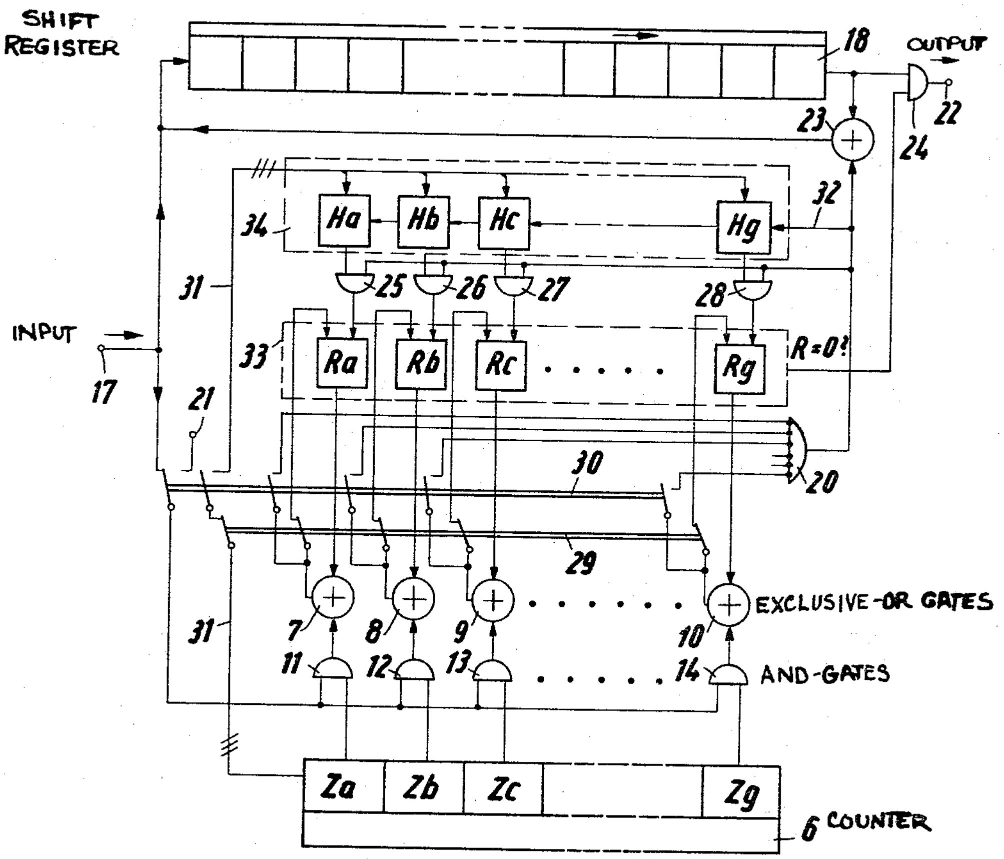
FIGURE 4 is a circuit diagram of another embodiment of a decoding unit for the receiving side which provides multiple error correction.

FIGURE 4 shows such a device for the correction of double errors. The counter 6 and the register 33 for the correction vector, the Exclusive-Or gates 7 to 10 and the AND-gates 11 to 14 are also present here and are connected to one another in the manner already described. The first step in forming the correction vector and the second step for the correction of single errors therefore take place as before. Here, too, the whole data group, which arrives at the input 17, is temporarily stored in the shift register 18. It is not, however, passed to the output 22 during the second step, and instead the shift register 18 is connected through the error-correcting Exclusive-Or gate 23, to form a shift ring in which the data group circulates until all the errors which can be corrected have been corrected. Only then is an AND-gate 24 opened which controls the output and which connects the output of the shift register 18 through to the output 22 of the decoding unit.

Here, the output of the comparison network 20 controls not only the error-correcting Exclusive-Or gate 23, but also the parallel transfer of the contents of an auxiliary register 34, having the register elements H*a*, H*b*, H*c* . . . H*g*, to the register 33. For this purpose, further *n* AND-gates 25, 26, 27 and 28 are provided, which are controlled by the output of the comparison network.

The fact that here, too, the operational control of the individual steps can be realized extremely simply, can be seen from the fact that the multiple contact bank 19 is replaced by no more than two multiple contact banks 29 and 30. In its normal position, the first contact bank 29 connects the outputs of the Exclusive-Or gates 7 to 10 to the inputs of the register elements R*a* to R*g*, while in its operated position, it interrupts these connections. This contact bank is brought briefly into its operated position during the second step and during the further steps as will be described hereinafter. The second contact bank 30 provides in its operated position a connection between the comparison network 20 and the outputs of the Exclusive-Or gates 7 to 10 and interrupts the connections in its normal position. During the entire first step, this contact bank is in its normal position and during all the further steps it is in its operated position. It corresponds largely to the contact bank 19 in FIGURE 3 and also has a contact which, in the normal position, connects the input 17 of the decoding unit to the AND-gates 11 to 14, while in its operated position it switches the One potential to these AND-gates via input 21. Finally, this decoding unit differs from that shown in FIGURE 3 by a parallel transfer path between the counter 6 and the auxiliary register. In order to simplify the illustration, this path is represented only by a single line 31 which connects the counter to the auxiliary register through two series-connected contacts each of which is associated with one of the two contact banks 29 and 30. This connection is only effective so long as the contact bank 29 is in its normal position and the contact bank 30 is in its operated position.

The operation of this decoding unit is as follows: During the first step, the correction vector is formed in the register 33 as explained. Then, both contact banks are brought out of the normal position shown into their operated position so that the second step can take place precisely as explained with reference to FIGURE 3.

If this step provides identity between the contents of the register and those of the counter, then the information bit which then appears at the output of the shift register 18 is corrected in the Exclusive-Or gate 23 and the contents of the auxiliary register 34 are simultaneously transferred via the AND-gates 25 to 28 to the first register. So far, however, the auxiliary register has not yet been connected through to the counter via line 31, so that after the transfer, both registers have the contents Zero. The criterion "Register 33 shows the contents Zero," which indicates the end of the correction operation, may be used to advantage to effect the output of the contents of the shift register through the output AND-gate 24. If no transfer error appeared at all, then this criterion leads to the output of the data group immediately after the first step. Thus it is possible for the decoding unit to be released as quickly as possible without extensive control means.

If two errors occurred during the transfer, then even the second step does not show identity between the first register and the counter, because the register contains the sum of two vectors which, with a maximum code, is not identical with any of the original vectors. After the termination of the second step, the first contact bank 29, which was in its operated position during the second step, is briefly brought into the normal position for the duration of a single clock pulse. As a result, the initial condition of the counter 6 is transferred not only over the line 31 into the auxiliary register, but is also added through the Exclusive-Or gates 7 to 10 to the former contents of the first register place-by-place, modulo 2. Then the contact bank 29 is restored to its operated position and so the second step is followed by a similar third step in which the first register is again compared with the counter contents. The control of the contact banks (which will in practice take the form of electronic devices) will, as mentioned above, be accomplished by means of pulses issued by a central unit (not shown). If the first information bit was one of the two erroneous information bits, then this third step leads to identity in the event of a counter state which corresponds to the other erroneous information bit. It is precisely this information bit which is available at this moment at the output of the shift register and which is corrected in the Exclusive-Or gate 23 and is subsequently returned to the input of the shift register. At the same time, the contents of the auxiliary register are transferred to the first register so that this now contains the initial state of the counter. If provision is made to ensure that the contact banks remain in their operated positions during a following fourth step, then, on comparison with the initial counter state, identity is automatically found so that the first information bit which at this moment appears at the output of the shift register 18 is likewise corrected. If the auxiliary register was set to Zero on the appearance of the first identity, which may be effected, for example, through a line 32, which is connected to the output of the comparison network, then, on the second identity, this Zero content is transferred through the AND-gates 25 to 28 to the first register, so that the contents of the shift register 18 can be issued depending on the termination criterion.

In the majority of cases, however, the assumption that the first information bit is erroneous is not correct. Then, the third step still does not lead to identity and to the response of the comparison network. With the last clock pulse of this step, the contact bank 29 is now brought into its normal position for two clock pulses, as a result of which the initial state of the counter and the state immediately following this are added successively to the first register through the Exclusive-Or gates 7 to 10. As a result of the peculiarity of the modulo 2 addition, which is identical with a corresponding subtraction, the initial counter state (first counter vector) which was added to the original correction vector at the beginning of the preceding step, is subtracted again, and instead the second counter vector is added to the original correction vector. At the same time, this second counter vector is also entered in the auxiliary register. The sum of the correction vector and the second counter vector is now available in the first register, so that this vector can be checked for identity with all the counter vetcors in the following step. If this step has not led to the indication of an identity either, then, on the last clock pulse of this cycle, the second counter vector is subtracted and on the following clock pulse the sum of the original correction vector and the third counter vector is produced in the first register; at the same time, this third counter vector is transferred to the auxiliary register.

This comparison operation is repeated until an identity is found. At the same time, the data group circulates in the shift register, Finally, when identity is found, the contents of the auxiliary register are transferred to the first 33, the auxiliary register 34 is cleared and the last error can be corrected and localized on the basis of the contents of the first register. In the course of this, the contents of the first register became Zero through the AND-gates 25 to 28, so that the termination criterion is fulfilled and the data group can be fed out. If no identity is found (i.e., more than two errors have occurred) it is possible to derive an error indicating signal.

After this explanation, the course of a calculation with reference to a numerical example will be described to make the operation of the decoding unit according to the invention completely clear. It is again assumed that the counter 6 works in accordance with the code shown in the table and that a data group 1001 has been provided with the check vector 0011110 at the transmitting side. 10010010110 has arrived at the receiving side, that is to say, the eighth information bit has been erroneously transmitted. In the first step, the correction vector is formed by vectorial addition of the columns 1, 4, 7, 9 and 10 of the table. This leads to the correction vector 0001000.

In the second step, this correction vector is compared with the individual columns and identity with the eighth column is found, that is to say, the error is in the eighth place. At the precise moment when the identity is found, the bit corresponding to this place is at the output of the shift register 18 ready for correction.

Now it will be assumed that not only the eighth place but also the third place has been erroneously transferred, that is to say, the data group received is 10110010110. In the first step, the correction vector is formed from the columns 1, 3, 4, 7, 9 and 10 of the table. It is therefore 0111101. The comparison with the existing columns of the table does not lead to identity in the second step this time. Accordingly, in the third step, all the columns of the table are compared with the vectorial sum of the first column and the correction vector. This sum is:

| | |
|---|---|
| correction vector | 0111101 |
| add first column | 1111000 |
| result in register **33** | 1000101 |

Since this vector does not appear in the columns of the table either, in a further step, the sum formed above is first added to the first column (as a result of which the original correction vector 0111101 appears again) and then is added to the second column, as follows:

| | |
|---|---|
| First, register **33** content | 1000101 |
| add first column | 1111000 |
| result is correction vector | 0111101 |

Then,

| | |
|---|---|
| correction vector in register **33** | 0111101 |
| add second column | 0001111 |
| result in register **33** | 0110010 |

In the course of this, the vector 0110010 is formed. The comparison step shows that this vector does not belong to the columns of the table either. The same operation is now repeated with the sum of the correction vector and the third column, which 0001000 appears, as follows:

First,

| | |
|---|---|
| register **33** content | 0110010 |
| add second column | 0001111 |
| result is correction vector | 0111101 |

Then,

| | |
|---|---|
| correction vector in register **33** | 0111101 |
| add third column | 0110101 |
| result in register **33** | 0001000 |

Comparison with the table shows that this vector precisely describes the eighth column, that is to say, identity with the counter contents is found just when the eighth information bit is ready at the output of the shift register. This is corrected, and the contents of the third column, which were previously stored in the auxiliary register, are transferred to the first register, and the final comparison step shows identity with the third column. Both errors have now been found and corrected. The first register has become Zero and the error-free data group can be delivered at the output 22.

Had the data group contained yet a third transmission error, then no reliable correction would be possible with the code used. There are codes, however, which have a greater redundancy, and with which three and more errors can be corrected. In order to satisfy these theoretical requirements, the decoding unit must have added thereto one auxilitry register for each additional error to be corrected. The procedure is the same as in the decoding unit described: First the correction vector is formed, and in the second step any single errors which may be present are corrected. In the third and further steps, any double errors which may be present are corrected. Then the sums of two columns of the table are made available in succession in the first auxiliary register and added to the correction vector. If a comparison of this new vector with the columns of the table shows identity, then the information bit which is available at the output of the shift register at the moment of identity is corrected, and the sum of two columns of the table made available in the first auxiliary register is taken over by the first register. The remaining double error is now corrected in the manner described.

Thus a data transmission system having a coding unit and decoding unit is provided which effects the correction of errors of any desired group code with comparatively little expenditure (but at the cost of time). A high operational reliability of the system is ensured precisely because of the low expenditure on control means and on storing and logic elements. By suitable selection of the code, the counter may be designed to be so redundant that a single error in the counter only leads to a single error in the message which is automatically corrected, however. By adding binary check bits to the n-dimensional binary vectors of the $n$-digit counter, it is possible to design the counter so that errors which arise in counting will be corrected in the counter. The correction is so executed that the next $n$-dimensional binary code vector to be generated by the counter after the occurrence of an error will be free of errors. A counter which is so constructed is referred to herein as one that is redundant. With many defects of the transmitting and receiving sides, it is possible to change over to a less redundant code with which the transfer system will still work.

It will be understood that the above description of the present invention is susceptible to various modifications, changes and adaptations, and the same are intended to be comprehended within the meaning and range of equivalents of the appended claims.

What is claimed is:

1. An error-correcting data transmission system including a transmitting side, a receiving side and a data transmission channel connecting them, and comprising, in combination:

(a) a coding unit for the transmission side for forming an $n$-place check vector for one data group at a time;

(b) a decoding unit for the receiving side similar to the coding unit at the transmission side for forming an $n$-place correction vector from the transmitted binary sequence of data group and check vector, said correction vector being zero for an error-free transmission and for using the correction vector to detect and, if necessary, correct a transmission error;

(c) said units each including (1) an $n$-digit counter which has different $n$-dimensional binary vectors having a value other than zero available in synchronism with the data transmission, (2) an $n$-digit register, and (3) $n$ Exclusive-Or gates connected to transmit the vectors from the counter in parallel to the register when the binary valve ONE is present on the data channel, the outputs of said register being connected as inputs to said Exclusive-Or gates such that the sum modulo 2 is formed in the register;

(d) means for supplying the contents of the coding unit register as a check vector to the transmission channel after passage of a data group; and (e) a comparison device upon which the register and the counter of the decoding unit jointly act and connected to have its output pulse reverse the binary value of a bit in the data group including the check vector, which bit is associated with the particular counter state present, in the event of identity between the register contents and the counter state.

2. A system as defined in claim 1, comprising a delay member in the form of a shift register at the receiving side for receiving a transmitted data group including the check vector in serial mode and arranged to have an output when the correction vector has been formed and the decoding counter begins to count again; and a correction gate connected to the output of said delay member and acted upon by said comparison device.

3. A system as defined in claim 2 for the detection of two erroneous bits because of which the comparison device can not find any identity between the correction vector and a counter vector, and comprising a further decoding register; and means for adding in succession through the decoding Exclusive-Or gates various decoding counter vectors to the correction vector present in the register to allow checking for identity with all the counter vectors through the comparison device, and when there is identity replacing this vector sum by the counter vector which was added to the correction vector immediately beforehand and which is available in the further register while the data groups including the check vector are caused to pass through the delay member in synchronism with the counting cycles until both errors have been detected by identity in each case and corrected.

4. A system as defined in claim 3 wherein the further register is set to ZERO by the output signal from the comparison device in the event of identity, and comprising means connected to the first decoding register for detecting the contents ZERO and cause feed out of the data group from the delay member.

5. An error-correcting data transmission system, including a transmitting side, a receiving side, and a data transmission channel connecting them, and comprising, in combination:

(a) a coding unit for the transmission side for forming an $n$-place check vector for one data group at a time, said coding unit including:

an $n$-place counter having a predetermined number of states forming a cycle thereof and including $n$ elements each having an output, $n$ AND-gates each associated with a respective counter element, each AND-gate having two inputs and an output, said counter element outputs being connected to one respective input of the associated AND-gates, a data group input connected in common to all of the other inputs of the AND-gates, an $n$-place register having $n$ elements each associated with a respective counter element and a shift mode for shifting the contents out of said register, each register element having an input and an output, $n$ EXCLUSIVE-OR gates each associated with a respective counter element and including two inputs and an output, one input being connected with the output of the associated AND-gate, the other input being connected with the output of the associated register element, and the output being connected with the associated register element input;

(b) a decoding unit for the receiving side similar to the coding unit at the transmission side for forming an $n$-place correction vector from the transmitted binary sequence of data group and check vector and for using the correction vector to detect and, if necessary, correct a transmission error;

(c) means for supplying the contents of the coding unit register as a check vector to the transmission channel after passage of a data group; and (d) a comparison device upon which the register and the counter of the decoding unit jointly act and connected to have its output pulse reverse the binary value of a bit in the data group including the check vector, which bit is associated with the particular counter state present, in event of identity between the register contents and the counter state.

6. A system as defined in claim 5 wherein said decoding unit includes:

an $n$-place counter having a predetermined number of states forming a cycle thereof and including $n$ elements each having an output;

$n$ AND-gates each associated with a respective counter element and each having two inputs and an output, said counter element outputs being connected to one respective input of the associated AND-gates, all of the other inputs being connected together, an $n$-place register having $n$ elements each associated with a respective counter element and each having an input and an output, $n$ EXCLUSIVE-OR gates each associated with a respective counter element and including two inputs and an output, one input being connected with the output of the associated AND-gate, the other input being connected with the output of the associated register element, a shift register having in excess of $n$ place, a data group input connected to said shift register, a NOR-gate having a single output and one input for each EXCLUSIVE-OR gate, an AND-gate opening terminal, switching means in a first position thereof connecting the output of each respective EXCLUSIVE-OR gate with the input of the associated register element and for connecting said other AND-gate inputs with said data group input, and in a second position thereof connecting the outputs of said EXCLUSIVE-OR gates with the NOR-gate inputs and said other AND-gate inputs with said gate opening terminal, and said comparison device including said NOR-gate and an output stage including an EXCLUSIVE-OR gate having two inputs and an output, one of said inputs being connected to the output of said shift register and the other of said inputs being connected to the output of said NOR-gate.

7. A system as defined in claim 5, wherein said decoding includes:

an $n$-place counter having a predetermined number of states forming a cycle thereof and including $n$ elements each having an output, a first set of $n$ AND-gates each associated with a respective counter element and each having two inputs and an output, said counter element outputs being connected to one respective input of the associated AND-gates, all of the other inputs being connected together, a first $n$-place register having $n$ elements each associated with a respective counter element, a second $n$-place register having $n$ elements each associated with a respective counter element and having an input for setting all of said elements at ZERO, a second set of $n$ AND-gates each having two inputs and an output, the first respective inputs being connected with the respective outputs of the associated second register elements, the respective outputs being connected as the respective inputs to the associated first register elements, $n$ EXCLUSIVE-OR gates each associated with a respective counter element and including two inputs and an output, one input being connected with the output of the associated AND-gate of said first set, the other input being connected with the output of the associated register element of the first register, a shift register having in excess of $n$ places, a data group input connected to said shift register, a NOR-gate having a single output and one input for each EXCLUSIVE-OR gate, said output being connected in common with all of said second respective inputs of said second set of AND-gate and with a ZERO setting input of said second register, an AND-gate opening terminal for the first set, first switching means in a normal position thereof for connecting the output of each respective EXCLUSIVE-OR gate with the input of the associated register element, and for connecting each counter element output into a condition which is ready to complete a connection with the input of the associated second register element, and in an operated position thereof disconnecting the above connections, second switching means in an operated position thereof for connecting the inputs of the respective second register elements with said ready connections thereby to, when the first switching means is in its normal position, connect the outputs of the respective counter elements with the respective inputs of the associated second register elements, for connecting said other AND-gate inputs of the first set with said AND-gate opening terminal, and for connecting the outputs of said EXCLUSIVE-OR gates with the NOR-gate inputs, and in the normal position thereof disconnecting the above connections and connecting said other AND-gate inputs of the first set with said data group input, and said comparison device including said NOR-gate and an output stage including an EXCLUSIVE-OR gate having two inputs and an output, one of said inputs being connected to the output of said shift register and the other of said inputs being connected to the output of said NOR-gate, the output being connected to the input of said shift register, and an AND-gate having an output and two inputs, one of said inputs being connected to the output of said shift register and the other input being connected to said first register and activated when all the elements thereof are ZERO.

References Cited

UNITED STATES PATENTS

| | | | |
|---|---|---|---|
| 3,123,803 | 3/1964 | Lisle | 340—146.1 |
| 3,159,810 | 12/1964 | Fire | 340—146.1 |
| 3,164,804 | 1/1965 | Burton | 340—146.1 |

OTHER REFERENCES

G. Hotz, Zur Mathematischen Theorie der Fehlerkorrigierendes Codes, Annales Universitatis Saraviensis-Scientia, vol. IX, Fasc. 1/2 1960/1961.

MALCOLM A. MORRISON, *Primary Examiner.*

ROBERT C. BAILEY, *Examiner.*

T. M. ZIMMER, K. MILDE, *Assistant Examiners.*